Jan. 22, 1963 L. PÉRAS 3,074,755
DOOR ASSEMBLY FOR A VEHICLE
Filed Feb. 1, 1961 3 Sheets-Sheet 1

Inventor
Lucien Péras
By Stevens Davis Miller & Mosher
Attorneys

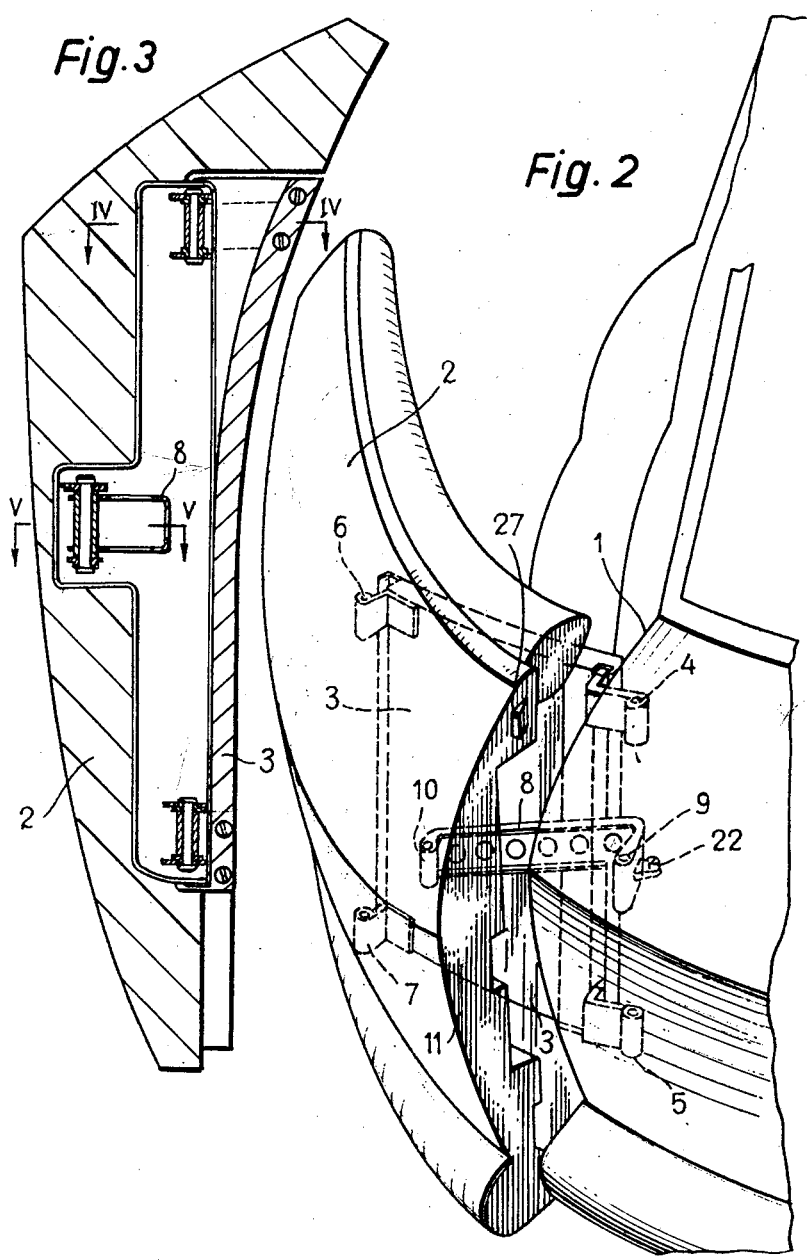

Jan. 22, 1963　　　　　　　　L. PÉRAS　　　　　　　3,074,755
DOOR ASSEMBLY FOR A VEHICLE
Filed Feb. 1, 1961　　　　　　　　　　　　　　　　3 Sheets-Sheet 3
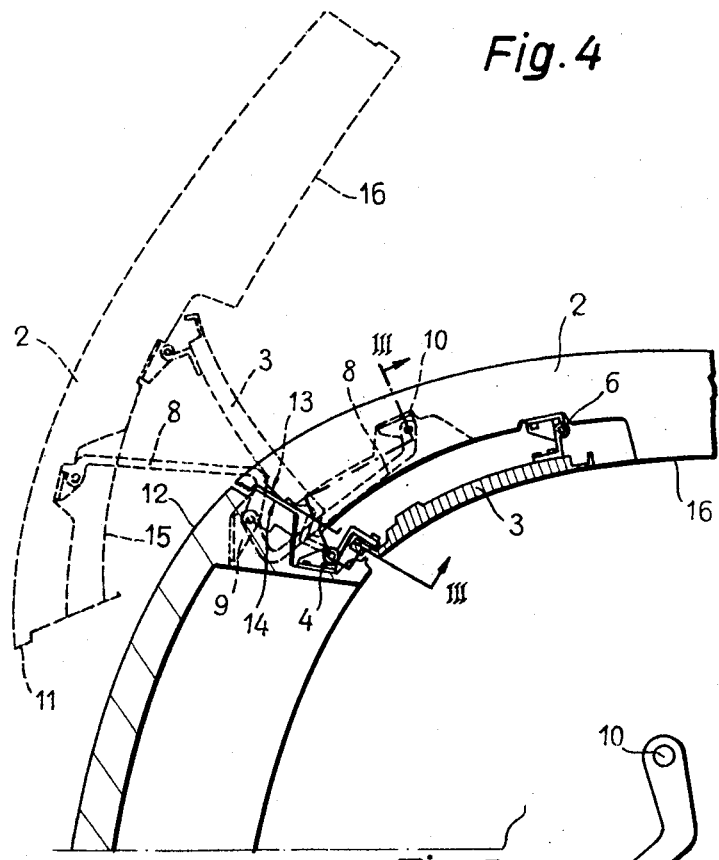
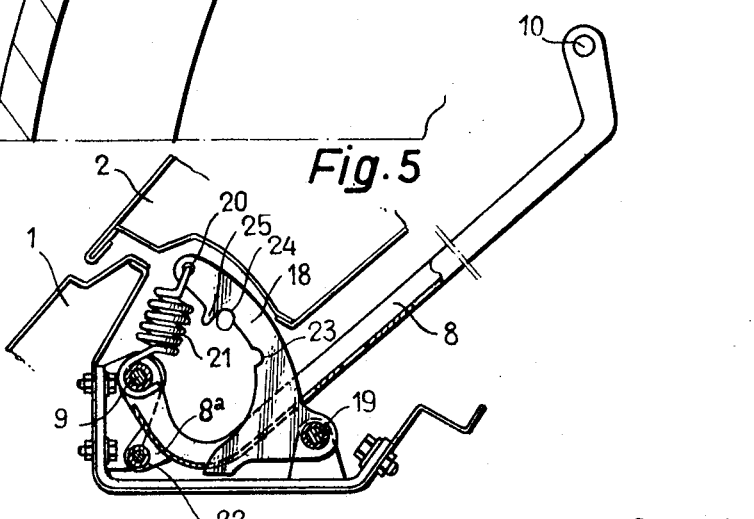
Inventor
Lucien Péras
By Stevens Davis Miller & Mosher
Attorneys

United States Patent Office 3,074,755
Patented Jan. 22, 1963

3,074,755
DOOR ASSEMBLY FOR A VEHICLE
Lucien Péras, Billancourt (Seine), France, assignor to Regie Nationale des Usines Renault, Billancourt, France
Filed Feb. 1, 1961, Ser. No. 86,521
Claims priority, application Italy Feb. 5, 1960
2 Claims. (Cl. 296—44)

This invention relates to the construction of vehicle doors and has specific reference to special door construction and hinge means for a vehicle.

It is the object of this invention to provide a door and a hinge system therefor, whereby a relatively large opening may be obtained for facilitating the access to and the exit from the interior of the vehicle while reducing the lateral projection constituted by the door in its open position. At the present time, when it is desired to have a relatively wide embrasure or opening to facilitate the access to the interior of the vehicle, this advantage is attended by the inconvenience of utilizing a door having very considerable longitudinal dimensions. This requirement and the space resulting therefrom when the door is open are a source of inconvenience, notably in that the access to the interior of the vehicle may be rendered difficult in certain cases, notably when the vehicle is parked alongside of another vehicle in a parking place, so that the free space available between the vehicles is reduced and may even in certain cases make it impossible to open the door.

With the door of this invention the inconvenience set forth hereinabove is avoided. The essential feature of this door is that it comprises two hinge elements connecting the door to the body which are so disposed that they form with the door proper a parallel motion system or an articulated quadrilateral whereby, when opening the door the latter pivots and accomplishes at the same time a movement of translation toward the front of the vehicle so as to facilitate considerably the access to the door opening and limit the lateral projection of the door when the latter is open.

According to a specific feature of this invention, one of said hinge elements consists of a movable wall adapted in the closed position to form an integral part of the inner wall of the door itself.

Other features and advantages of this invention will appear as the following description proceeds with reference to the accompanying drawings illustrating diagrammatically by way of example a typical embodiment of a door constructed and mounted according to the teachings of this invention. In the drawings:

FIGURES 1 and 2 are fragmentary perspective views illustrating a door according to this invention which is mounted on the body of a forward-control vehicle;

FIGURE 3 is a vertical section taken upon the broken line III—III of FIG. 4;

FIGURE 4 is a horizontal section of the body pillar which is taken upon the line IV—IV of FIG. 3, and FIGURE 5 is a cross section taken upon the line V—V of FIG. 3.

Figure 1:
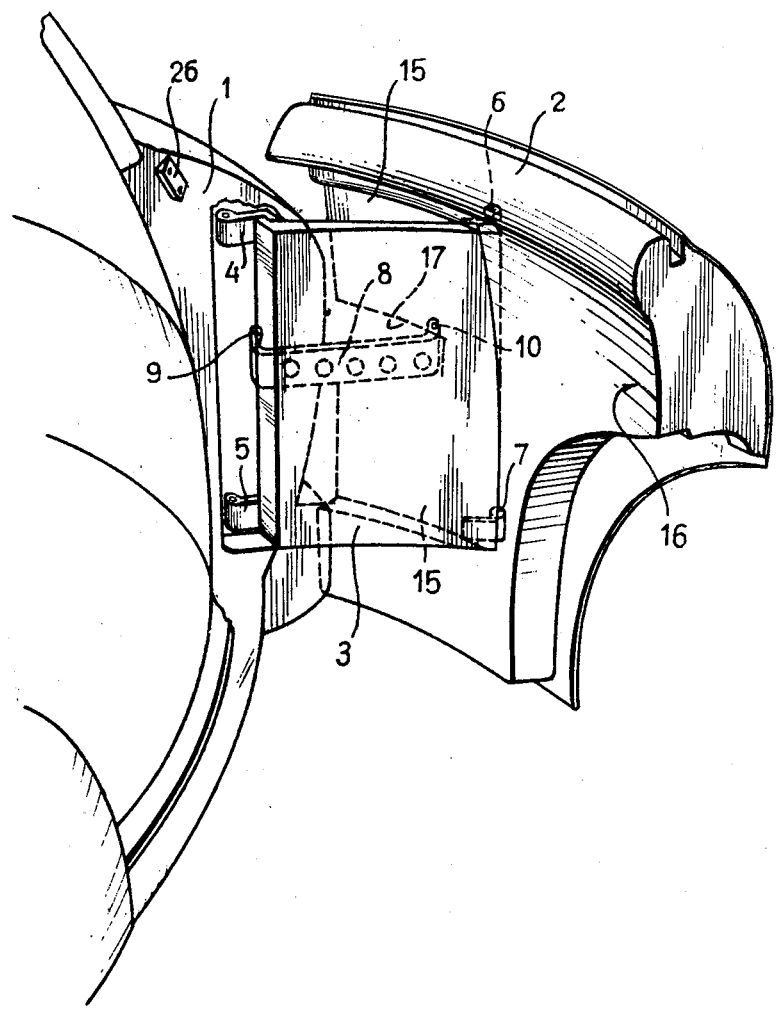

The reference numeral 1 designates the front door pillar of the body which is to support the door designated in general by the reference numeral 2. The door is connected to the pillar 1 by means of an intermediate member 3 consisting essentially of a movable wall provided with hinges 4, 5 connecting this wall to the pillar 1 of the vehicle body and with other hinges 6, 7 connecting the wall 3 to the door structure 2. Another connecting member or arm 8 has one end 9 connected through hinge means to the pillar 1 and its other end 10 connected through other hinge means to the door 2.

The axes for mounting the hinges of the movable wall element 3 and of the member 8 on the pillar 1 and door 2 are so disposed that the wall element 3 and member 8, in combination with the door proper, constitute substantially an articulated quadrilateral or parallel motion structure. As a result, when the door is opened the movement accomplished by the door 2 comprises a movement of rotation and at the same time a movement of translation of the door toward the front of the vehicle.

Under these conditions, the front edge 11 of door 2 moves beyond the outer surface 12 of the front portion of the vehicle body and in the fully open position it occupies the position shown in broken lines in FIG. 4.

The movable wall 3 comprises a bearing surface 13 covered if desired with elastic trim or shock absorbing elements which is adapted to contact a fixed surface 14 formed on the door pillar 1 of the body for the purpose of limiting the movement of door 2. In the closed position of the door the movable wall 3 nests completely in a recess 15 formed on the inner side of the door so as to be flush with the inner surface 16 thereof; similarly, when the door is closed the member or arm 8 is received in a special cavity 17 formed in the door 2.

Moreover, a detent-positioning device is provided for maintaining the door in its open position; this device is operatively connected with the hinge mounting member 8. This device comprises essentially a lever 18 of substantially horseshoe configuration (see FIG. 5), having one end 19 pivotally mounted on an element rigid with the door pillar 1 of the vehicle body, its opposite end 20 being retained by a traction spring 21. The other end of this spring 21 is anchored on the hinge pin 9 of the aforesaid member 8. This member 8 comprises a lug extension 8a carrying a small stud 22 adapted to engage notches 23, 24 formed in the inner edge of the horseshoe member 18. A projection 25 is formed near the second notch 24 in the inner edge of member 18 to constitute an end stop or check member for the stud 22.

With this arrangement, when the door 2 is opened the stud 22 of member 8 pivots on the inner surface or edge of member 18 and occupies the notches 23, 24 thereof in succession. The first notch 23 constitutes a first position in which the stud 22 keeps the door partially open, and the second notch 24, in combination with the aforesaid projection 25, provides the maximum permissible outward position of the stud 22 in relation to the fully open door. Of course, the presence of the notches 23, 24 prevents the door from closing unassisted, for example under the influence of wind or of its own weight, when it is brought in positions corresponding to the engagement of said stud 22 with said notches. In fact, the spring 21 is so effective that said stud cannot escape from the notches 23, 24 unless an adequate pressure is exerted on the door.

Due to the special mounting of the door hinges proper and in order to avoid an accidental opening of the door, two tooth-shaped catches or strikers are provided, as shown at 26 and 27. The first catch is secured on the door pillar and the second one is secured on the door itself. They are adapted to engage each other when the door is closed. Their function consists in preventing the front end of the door, which is adjacent to the pillar 1, from accomplishing a movement of translation with respect to this pillar, so that the opening movement of the door commences with a first rotation about the hinge axes 4, 5 in order to release the catches 26, 27 from each other.

From the foregoing it will be readily understood that the lateral space occupied by the door in its open position is reduced considerably in comparison with the overall dimensions obtained with conventional arrangements, this reduction resulting from the combination of the two movements of rotation and translation of the door proper. In fact, the resultant of these movements is such that in the open position the door end opposite to that adjacent to the hinges will be spaced forward with respect to the corresponding edge of the aperture through which access can be had to the car interior and the effect thus obtained corresponds substantially to a reduction in the longitudinal dimensions of the door itself.

Of course, many modifications may be brought to the constructional details, relative proportions and shapes contemplated herein without departing from the basic principles of the invention as set forth in the appended claims.

I claim:

1. A door assembly for a vehicle having a body, said body having a door opening and a door pillar defining one side of the opening, said door assembly including a door normally seated in said opening and closing said opening, a first hinge mounting element hingedly connected to the door pillar and to the inside of the door, a second hinge mounting element hingedly connected to the door pillar and to the inside of the door, said hinge mounting elements being of unequal length and having their respective hinge axes on the door pillar and on the door at different spacings to form an articulated, irregular, quadrilateral motion system so that the door pivots and accomplishes a motion of rotation and of translation with respect to the body whereby to reduce considerably the surface swept over by the door during its opening movement, the door being provided with a detent-positioning device to maintain the door in two different opening positions and one of said hinge mounting elements being an arm and said arm carrying a stud, which forms part of said detent-positioning device, said detent-positioning device further including a horseshoe-shaped lever retained by a retraction spring and formed with a pair of positioning notches engaged by said stud.

2. A door assembly for a vehicle having a body, said body having a door opening and a door pillar defining one side of the opening, said door assembly including a door normally seated in said opening and closing said opening, a first hinge mounting element hingedly connected to the door pillar and to the inside of the door, a second hinge mounting element hingedly connected to the door pillar and to the inside of the door, said hinge mounting elements being of unequal length and having their respective hinge axes on the door pillar and on the door at different spacings to form an articulated, irregular, quadrilateral motion system so that the door pivots and accomplishes a motion of rotation and of translation with respect to the body whereby to reduce considerably the surface swept over by the door during its opening movement, and a tooth-shaped catch secured on the door pillar and a cooperating tooth-shaped catch secured on the end of the door, adjacent the pillar, said catches preventing the door end from effecting a movement of translation with the opening movement of the door commencing until a rotary motion releases the catches.

References Cited in the file of this patent
UNITED STATES PATENTS

| 1,009,727 | Duigan | Nov. 28, 1911 |
| 1,257,572 | Appleby | Feb. 26, 1918 |
| 1,302,178 | Korb | Apr. 29, 1919 |
| 2,147,133 | Ackerman | Feb. 14, 1939 |
| 2,743,773 | Weiertz | May 1, 1956 |
| 2,763,900 | McAfee | Sept. 25, 1956 |
| 2,956,836 | James | Oct. 18, 1960 |

FOREIGN PATENTS

| 452,679 | Great Britain | Aug. 27, 1936 |
| 824,780 | Great Britain | Dec. 2, 1959 |